US011879478B2

(12) United States Patent
Spies

(10) Patent No.: US 11,879,478 B2
(45) Date of Patent: Jan. 23, 2024

(54) CENTRIFUGAL SUPERCHARGER TRANSMISSION CASE

(71) Applicant: Christopher Scott Spies, Belton, MO (US)

(72) Inventor: Christopher Scott Spies, Belton, MO (US)

( * ) Notice: Subject to any disclaimer, the term of this patent is extended or adjusted under 35 U.S.C. 154(b) by 0 days.

(21) Appl. No.: 17/745,796

(22) Filed: May 16, 2022

(65) Prior Publication Data

US 2022/0364574 A1 Nov. 17, 2022

Related U.S. Application Data

(60) Provisional application No. 63/189,218, filed on May 16, 2021.

(51) Int. Cl.

*F04D 29/42* (2006.01)
*F02B 33/40* (2006.01)
*F04D 29/056* (2006.01)
*F04D 29/046* (2006.01)
*F04D 29/04* (2006.01)
*F04D 17/12* (2006.01)
*F04D 29/043* (2006.01)
*F04D 29/05* (2006.01)

(52) U.S. Cl.

CPC .......... *F04D 29/4206* (2013.01); *F02B 33/40* (2013.01); *F04D 29/056* (2013.01); *F04D 17/125* (2013.01); *F04D 29/04* (2013.01); *F04D 29/043* (2013.01); *F04D 29/046* (2013.01); *F04D 29/05* (2013.01); *F04D 29/0563* (2013.01)

(58) Field of Classification Search

CPC .... F04D 29/4206; F04D 29/056; F04D 1/066; F04D 13/028; F04D 13/06; F04D 13/0633; F04D 13/14; F04D 17/08; F04D 17/122; F04D 17/125; F04D 25/02; F04D 29/04; F04D 29/043; F04D 29/046; F04D 29/05; F04D 29/0563; F02B 33/40

See application file for complete search history.

(56) References Cited

U.S. PATENT DOCUMENTS 6,478,469 B1 * 11/2002 Jones ...................... F16C 19/55 123/559.1
2010/0329854 A1 * 12/2010 Middlebrook ...... F04D 29/4206 415/170.1
2015/0322958 A1 * 11/2015 Date ..................... F01D 25/243 29/889.22
2016/0177784 A1 * 6/2016 Archer .................. F01D 25/183 415/170.1

OTHER PUBLICATIONS

Parveen Kumar and M F Wani, Effect of load on the tribological properties of hypereutectic Al—Si alloy under boundary lubrication conditions, Nov. 20, 2017, IOP Publishing, Materials Research Express, p. 2 (Year: 2017).*

* cited by examiner

*Primary Examiner* — Binh Q Tran
(74) *Attorney, Agent, or Firm* — BRADLEY IP, LLC

(57) ABSTRACT

A supercharger transmission case that includes both small and large impeller shaft bearing bores in a single component to avoid potential misalignment, and to allow the bores to be machined during the same machining setup by the same tool. The supercharger transmission case may be fabricated of low thermal expansion material, such as a hypereutectic metal matrix comprising aluminum and silicon, to further reduce thermal expansion of the transmission case and bearings.

7 Claims, 8 Drawing Sheets

CENTRIFUGAL SUPERCHARGER TRANSMISSION CASE

CROSS REFERENCE TO RELATED APPLICATIONS

This application claims the benefit of the prior-filed, provisional patent application, Ser. No. 63/189,218, filed May 16, 2021, incorporated herein by reference.

BACKGROUND OF THE INVENTION

Field of the Invention

The present invention relates to automotive engine components and more particularly to a supercharger transmission case incorporating integrated, single-component, small and large impeller shaft bearing bores.

Description of the Related Art

In general, power output of an internal combustion engine may be enhanced by providing compressed air to the engine. Superchargers are generally recognized in the prior art as devices that provide increased airflow via a bladed impeller or fan. An impeller is driven by an impeller shaft that is seated in a case, typically a supercharger transmission case. Resistance to rotation of the shaft is greatly decreased by affixing bearings to the shaft that are seated within bores in the supercharger case. Typically, supercharger cases utilizing multiple bearing diameters on the impeller shaft comprise two separable halves, a transmission case and a transmission cover. A small impeller bearing mounted on the impeller shaft is seated in a small bearing bore formed in the transmission cover, and a large impeller bearing mounted on the impeller shaft, between the small bearing and the impeller, is seated in a large bearing bore formed in the transmission case. The transmission case and the transmission cover are aligned by dowels and may be subject to misalignment of the two bores due to accumulation of variances in tolerances between the dowels, the cover and the case. Misalignment of the small bearing bore and large bearing bore causes oscillation of the shaft as it deviates from rotation about its rotational axis. This creates irregular loading of the bearings, resulting in the bearings having diminished load and speed capabilities. The misalignment of the bores creates irregular loading as it results in unintended ball-to-race stress concentration. Thermal expansion of the bore causes the bearings to become loose resulting in oscillation of the impeller shaft. This oscillation is transmitted to the impeller which necessitates an increase in impeller-to-case clearances, thereby diminishing the compressor's efficiency—the ability to move air—and may eventually cause damage to the shaft, bearings and/or impeller, and early failure of the supercharger.

Supercharger designs and manufacturing processes in the prior art attempt to mitigate misalignment by first machining the case, large bearing bore and alignment dowels, then installing the cover with, at-most, a rough-cut small bearing bore. In some prior art methods of manufacture, the cover is installed with no prior bore at all and both rough and final machining of the small bore is performed with the cover fitted to the case. Final machining of the small bearing bore is then performed using the large bearing bore as a cutting reference.

What is needed is a supercharger design and method of manufacture that avoids the need for such dual-stage machining of the bores and that eliminates the potential for misalignment of the bores.

SUMMARY OF THE INVENTION

One or more embodiments of the present invention may comprise a supercharger case that includes both small and large impeller shaft bearing bores in a single component to avoid potential misalignment. Because both bores are machined into the supercharger case, versus one into the case and the other into the cover, the bores may be machined during the same machining setup by the same tool. This invention also eliminates the need for dowel pin connection and alignment between the case and cover because such alignment is no longer necessary to attempt to align the small and large bearing bores.

Certain embodiments of the invention may comprise a supercharger case made of low thermal expansion material, such as a hypereutectic metal matrix comprising aluminum and silicon, to further reduce thermal expansion of the transmission case and bearings. An example of an operative high performance aluminum silicon alloy includes the 4632 alloy (also referred to as the AMC® 4632 alloy) sold by Materion Corporation of Ohio, US. The 4632 alloy is manufactured using a powder metallurgy method that results in a material microstructure with relatively high thermal conductivity, that is lightweight, that has a low coefficient of thermal expansion (CTE) relative to aluminum and many other aluminum alloys, and, therefore, that provides structural stability at elevated temperatures.

Certain embodiments of a supercharger transmission case may comprise a forward impeller shaft bearing bore machined into the forward surface of the main body of the transmission case, the forward impeller shaft bearing bore sized for receiving a forward impeller shaft bearing. The rear impeller shaft bearing bore is machined into a bridge portion of the transmission case, the rear impeller shaft bearing bore sized for receiving a rear impeller shaft bearing and the bridge positioned rearward of and spanning the forward impeller shaft bearing bore. The supercharger transmission case may be fabricated from a low thermal expansion material to reduce positional variance of an impeller shaft assembly and permit use of reduced bearing-to-bore-surface clearances. The supercharger transmission case may be fabricated from a low thermal expansion material to reduce oscillation or other transverse movement of an impeller shaft and an impeller assembly relative to the shaft longitudinal axis. The low thermal expansion material may be a hypereutectic metal matrix, including a hypereutectic metal matrix comprising aluminum and silicon.

Other advantages of the invention will become apparent from the following description taken in connection with the accompanying drawings, wherein is set forth by way of illustration and example several embodiments of the present invention.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
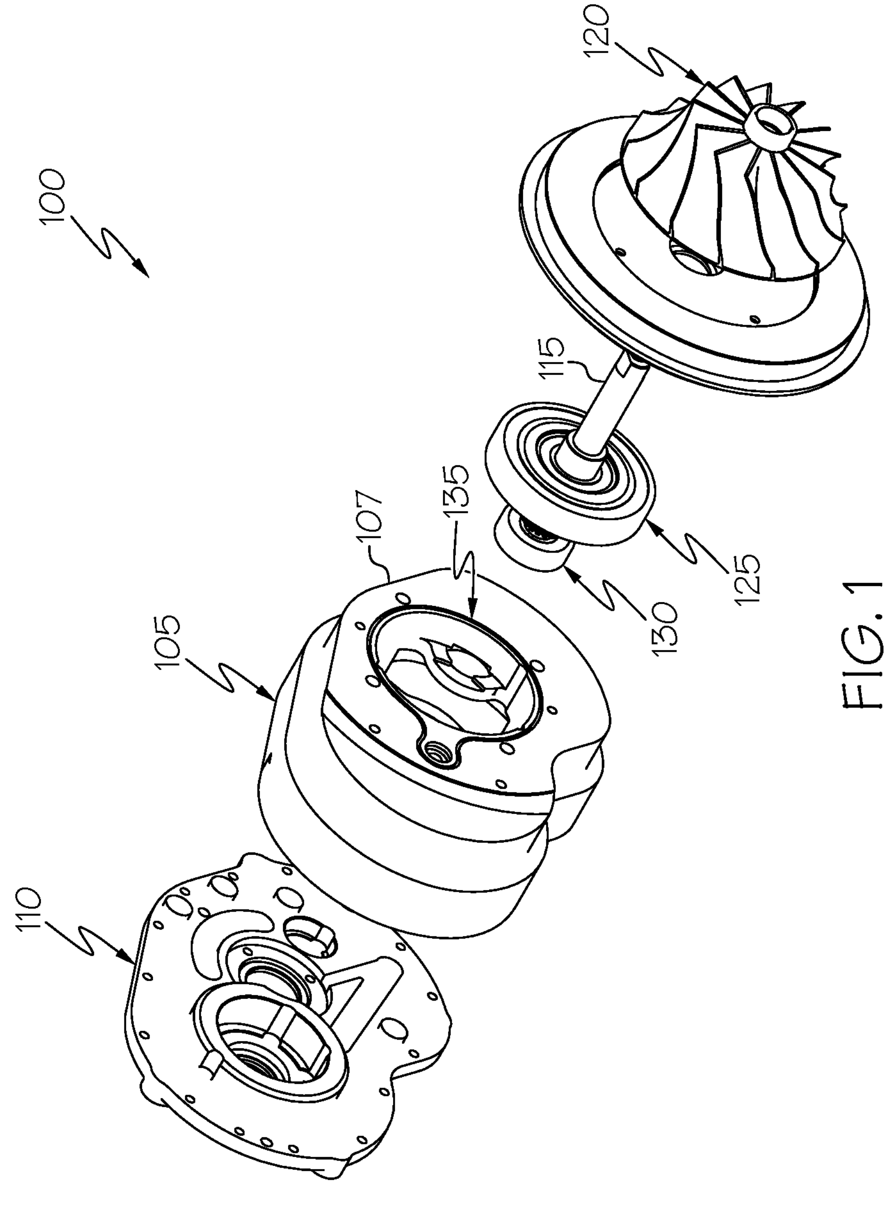
FIG. 1 is a front, perspective, exploded view of a supercharger transmission case assembly of the present invention.
Figure 2:
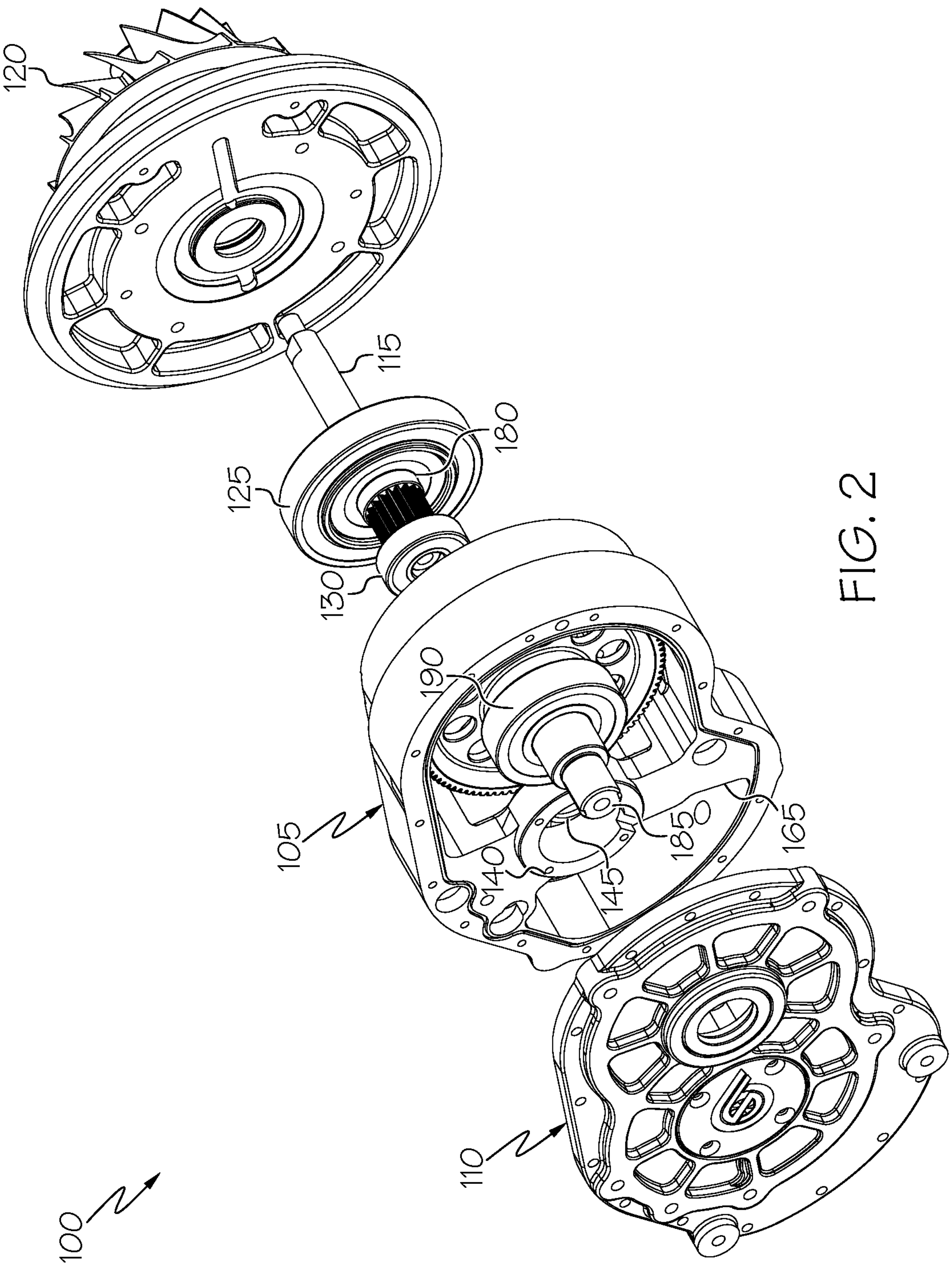
FIG. 2 is a rear, perspective, exploded view of the supercharger transmission case assembly of FIG. 1.

Referring now to the drawings, FIG. 1 illustrates a front, perspective, exploded view of a partial supercharger transmission case assembly 100 of the present invention and FIG. 2 illustrates a rear, perspective, exploded view of the same. As shown, the supercharger transmission case assembly 100 comprises a transmission case 105, a transmission cover 110, an impeller shaft 115, an impeller 120, a forward impeller shaft bearing 125 (forward or large bearing) and a rear impeller shaft bearing 130 (rear or small bearing). The forward bearing (large bearing) 125 is typically relatively larger than the rear bearing (small bearing) 130. When assembled, the large bearing 125 is seated in a large bearing bore 135 machined into the forward surface 107 of the main body of the transmission case 105 and the small bearing 130 is seated in a small bearing bore 140 machined further into the transmission case 105 from the forward surface 107 of the transmission case 105. An impeller shaft bore 145 passes through the body transmission case 105 from the axial center of the small bearing bore 140 to the rear surface 150 of the transmission case 105. The impeller shaft 115 is situated near a distal end within the impeller shaft bore 145 and is situated at a proximal end within a compressor backplate bore 155 centrally located in a compressor backplate 160. The compressor backplate 160 is positioned between the impeller 120 and transmission case 105 and is attached to the forward surface 107 of the transmission case 105.

Figure 4:
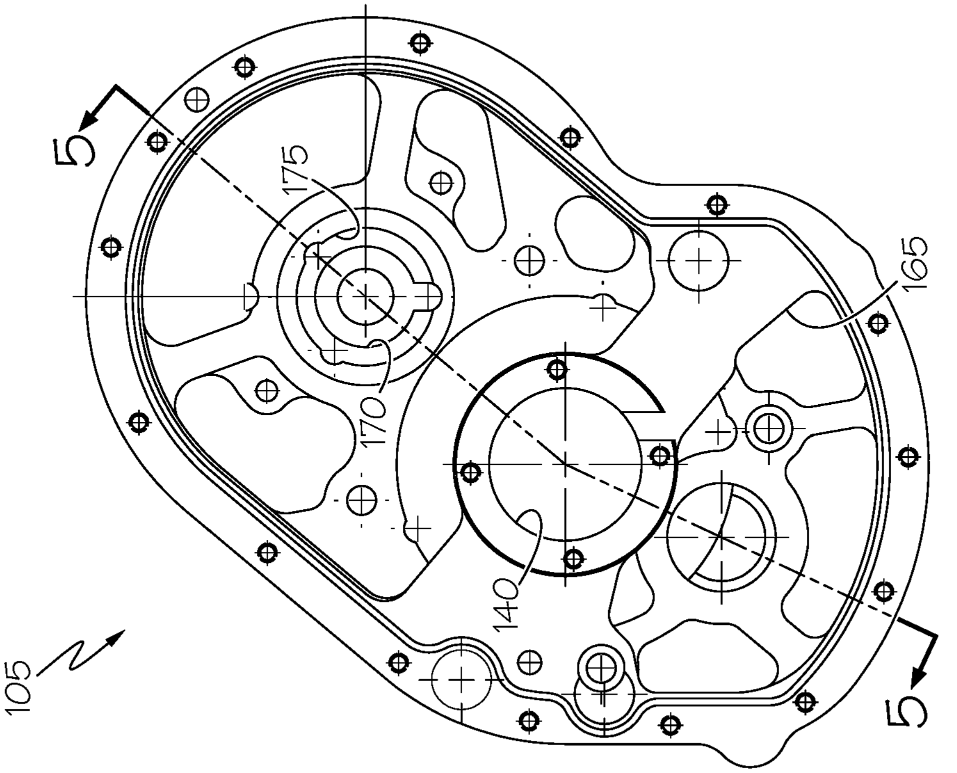
FIG. 4 is a rear view of the transmission case.
Figure 3:
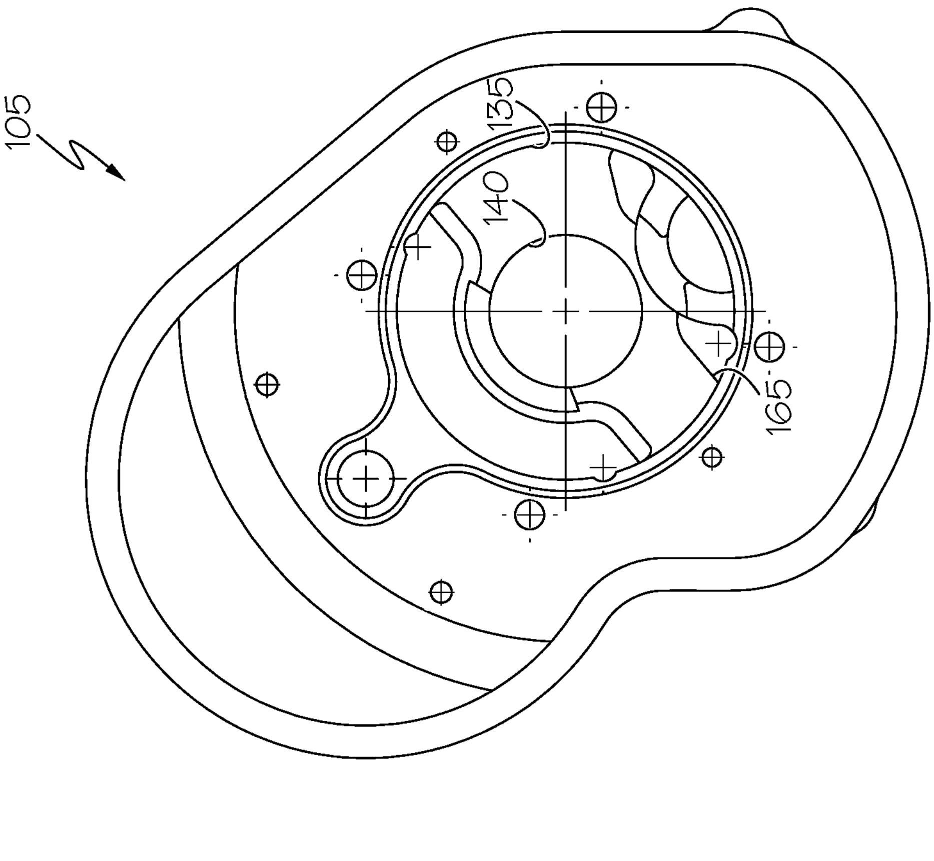
FIG. 3 is a front view of the transmission case.
Figure 5:
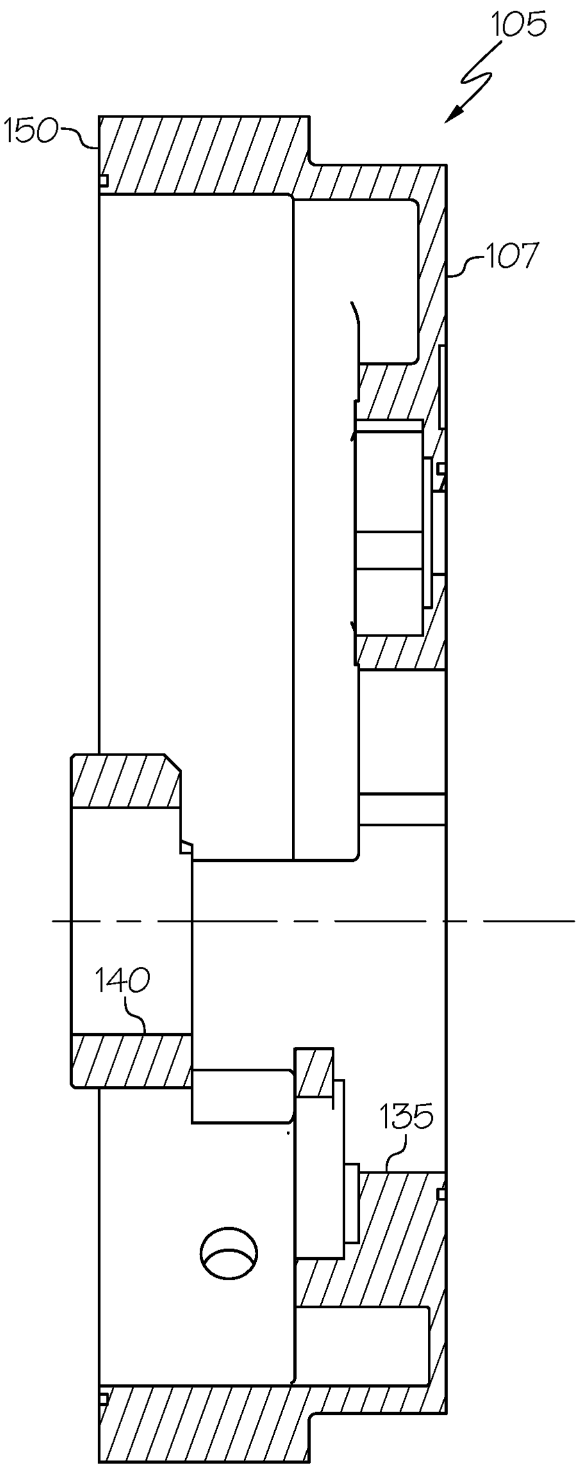
FIG. 5 is a cross sectional view of the transmission case taken generally along line A-A in FIG. 4.
Figure 7:
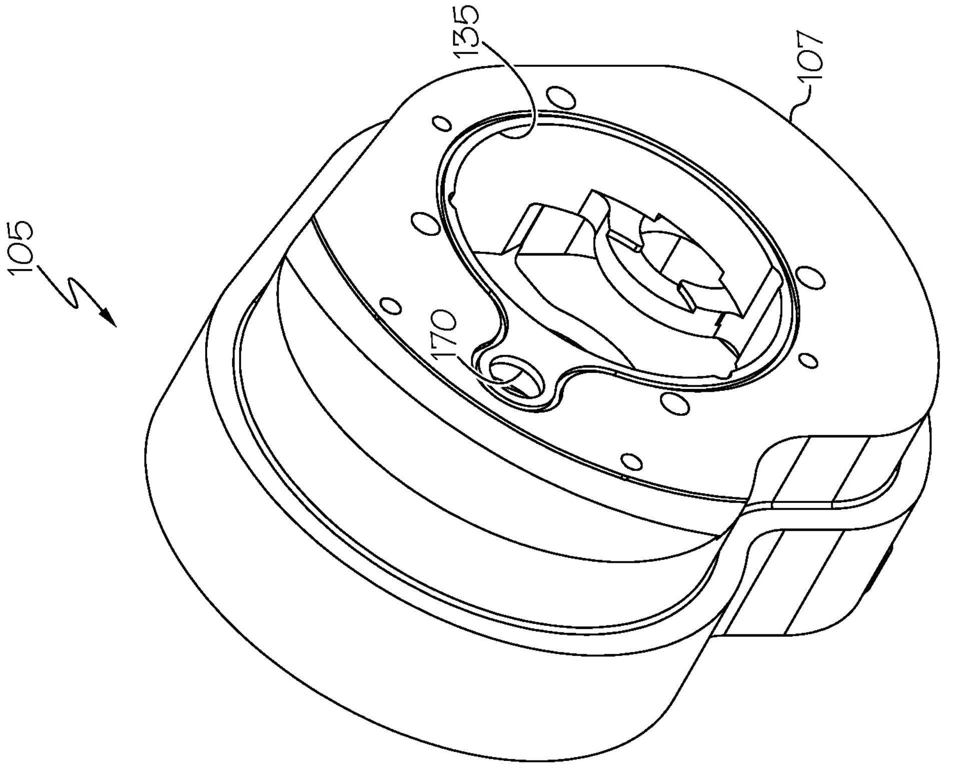
FIG. 7 is a front perspective view of the transmission case.
Figure 6:
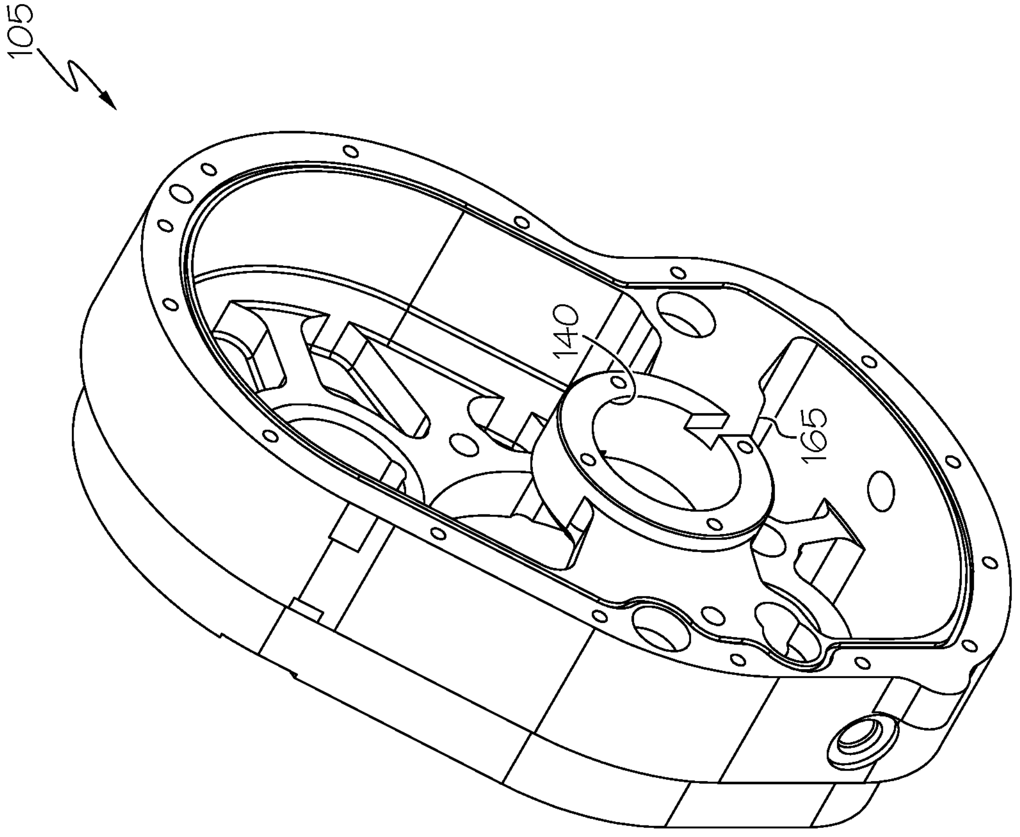
FIG. 6 is a rear perspective view of the transmission case.
Figure 10:
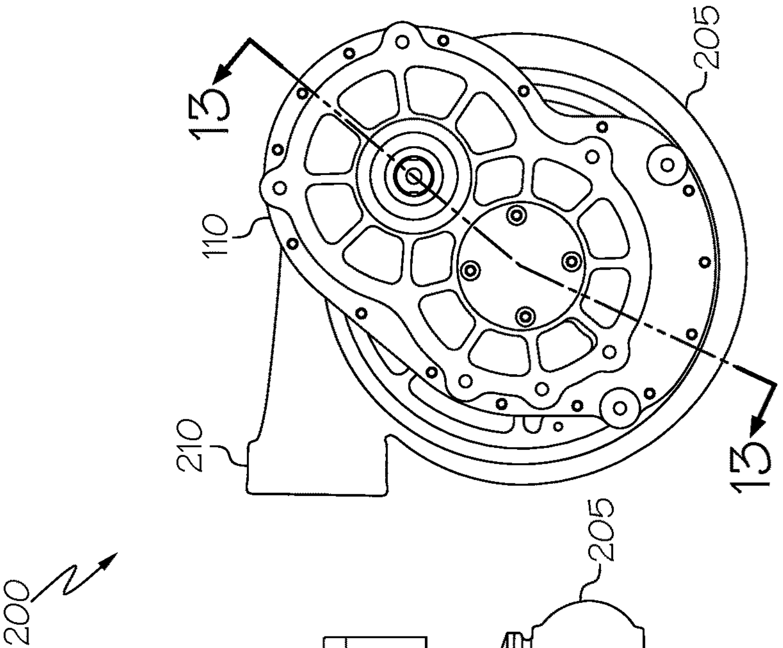
FIG. 10 is a rear view of a supercharger including a rear view of a transmission cover.
Figure 9:
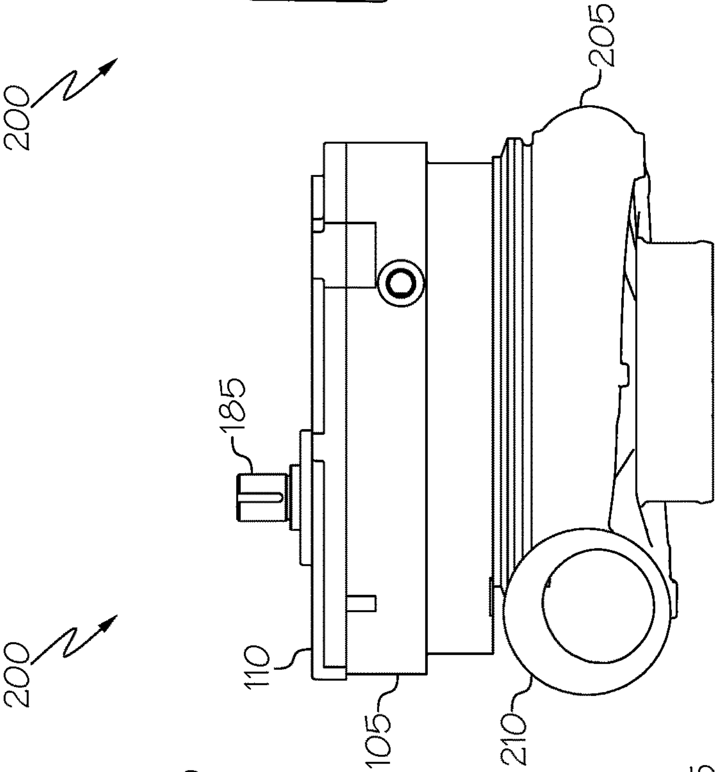
FIG. 9 is a right, side view of a supercharger including a right, side view of a transmission case.
Figure 8:
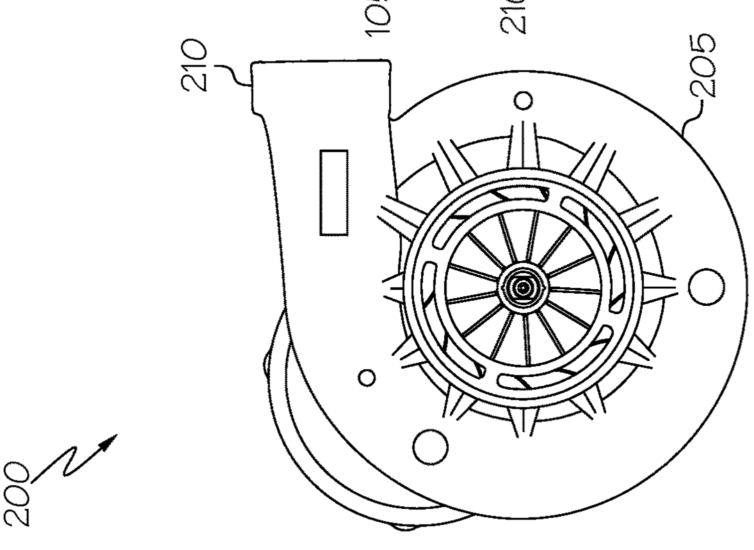
FIG. 8 is a front view of a supercharger including a transmission case.
Figure 11:
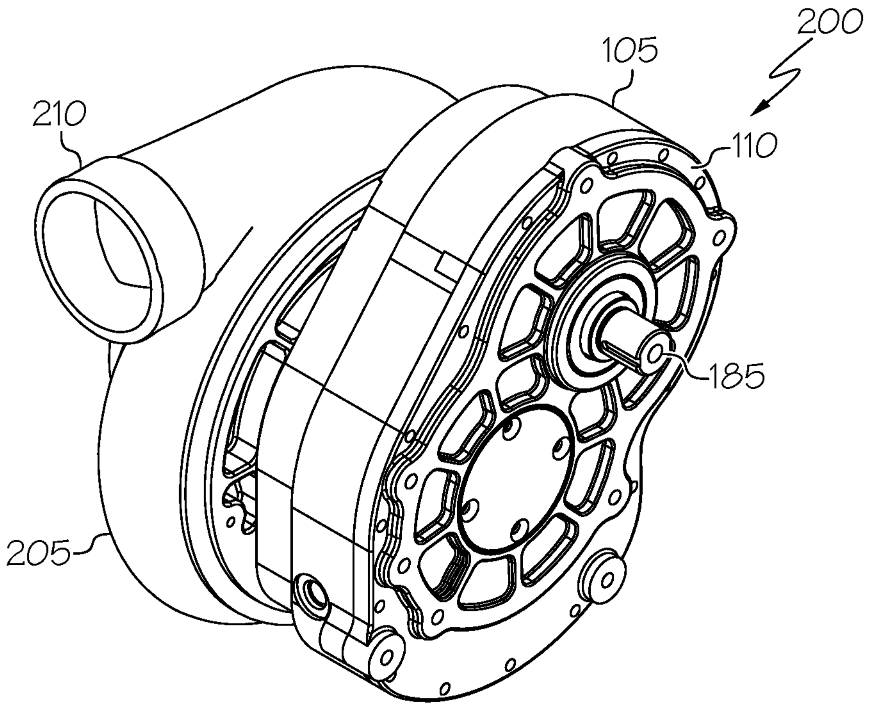
FIG. 11 is a rear, perspective view of a supercharger.
Figure 12:
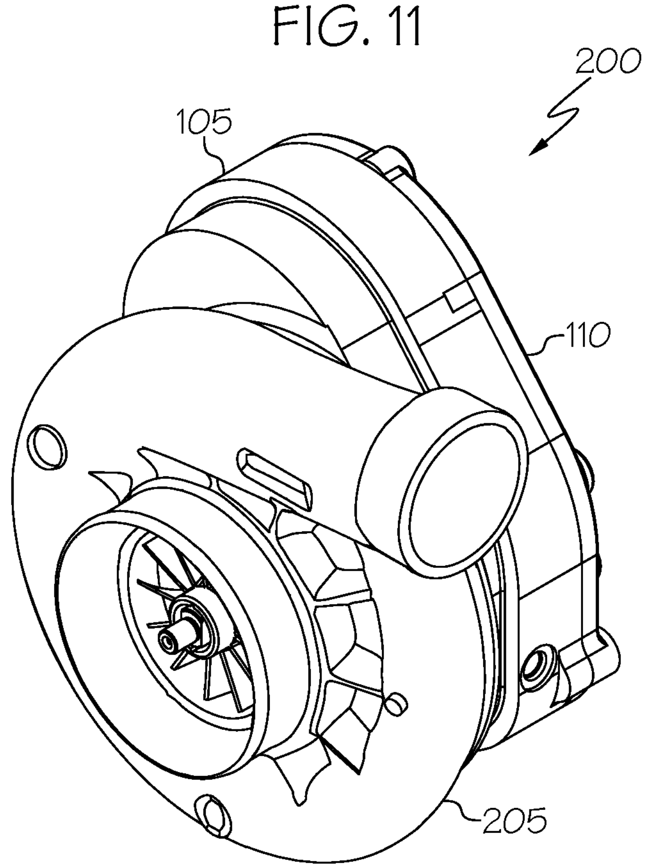
FIG. 12 is a front, perspective view of a supercharger.

As shown in FIGS. 3 and 4, which are front and rear views of the transmission case 105, respectively, the small bearing bore 140 is machined into a portion of the case referred to herein as the bridge 165. The bridge 165 is disposed rearward of the large bearing bore 135 and spans across the left and right sides of the case 105, with an enlarged, generally central portion in which the small bearing bore 140 is formed. The bridge 165 provides a structure for containing the small bearing bore 140 while allowing access to, and proper positioning and spacing of, the input shaft bore 170, input shaft small bearing bore 175, and input shaft small bearing 180. In certain embodiments of the present invention, the bridge 165 is machined from a separate piece of stock and welded or otherwise attached (e.g. bolted) to the rear surface 150 of the case 105.

The input shaft 185 and input shaft large bearing 190 are shown in position in FIG. 2. (The input shaft large bearing 190 is positioned upon the input shaft 185 rearward of the input shaft small bearing 180 and thus obstructs the view of same in this figure.) The input shaft bore 170 and input shaft small bearing bore 175 are machined into the rear surface of the transmission case 105, as shown in FIG. 4, forward of and the side of the bridge 165 and small bearing bore 140.

The transmission case 105 is typically machined on a CNC milling machine using a cylindrical cutter typically moving on at least 3 axes. It is typically machined from round or rectangular billet stock but may also be machine from a casting. The transmission case 105 typically comprises a low thermal expansion material, such as a hypereutectic metal matrix comprising aluminum and silicon. Hypereutectic metal matrix alloys greatly reduce thermal expansion of the case 105 structure and, therefore, of the bearing bores 135, 140 formed therein. This reduction of thermal expansion reduces positional variance of the impeller shaft assembly, thereby permitting the use of reduced bearing-to-bore-surface clearances, which improves efficiency of the supercharger 200. This tighter fit of the bearings within the bores enabled by the more exact alignment of the small bore 140 and large bore 135, reduces oscillation or other transverse movement of the impeller shaft 185 and impeller assembly relative to the shaft longitudinal axis, thereby reducing damaging harmonics and vibrations. In certain embodiments of the invention, the transmission cover 110 and compressor backplate 160 comprise the same or similar material, in other embodiments the cover 110 and backplate 160 comprise aluminum or other aluminum alloys. In certain embodiments of the invention where weight minimization is not a priority, the transmission case 105 and/or cover 110 and backplate 160 comprise cast iron and/or steel.

To form the features of the transmission case 105, the raw stock (billet or casting) is typically clamped in a vice and the rear surface 150 (i.e. the surface that will face and attach to the transmission cover 110) pocketing, drilling, tapping and interior profiling is machined, typically using endmills, a face mill for surfacing, drills, and taps for cutting threads in drilled holes. The stock is then reversed in orientation and mounted to a fixture plate so that the forward surface 107 faces the cutting tools. Rough bearing bores, interior pocketing and profiling, and other features, are machined, typically using endmills and a face mill for surfacing. In the same setup, without having to move the stock, the machining of the bearing bores is completed using an endmill or boring bar. Finish machining of both bores 135, 140 may then be performed, optionally with a custom cutter, without the need to move and reattach the stock to the fixture plate thus avoiding even slight misalignment of the bores 135, 140 during machining. Alternatively, rough cut bores may be finish machined on a lathe, also cutting both bores 135, 140 without the need to move and remount the stock. It should be appreciated that by finish machining both the small bearing bore 140 and large bearing bore 135 on a common piece of stock, and also during one setup, the need to precisely align two parts (the transmission cover and case) as in the prior art is avoided and thus misalignment of the small and large bores is eliminated.

The large and small bearings 125, 130 typically comprise super-precision angular contact bearings. The bearings typically comprise steel, such as 52100 steel, with the bearing balls held in machined bronze or phenolic cages. In certain embodiments, the bearings may comprise ceramic bearing balls.

Figure 13:
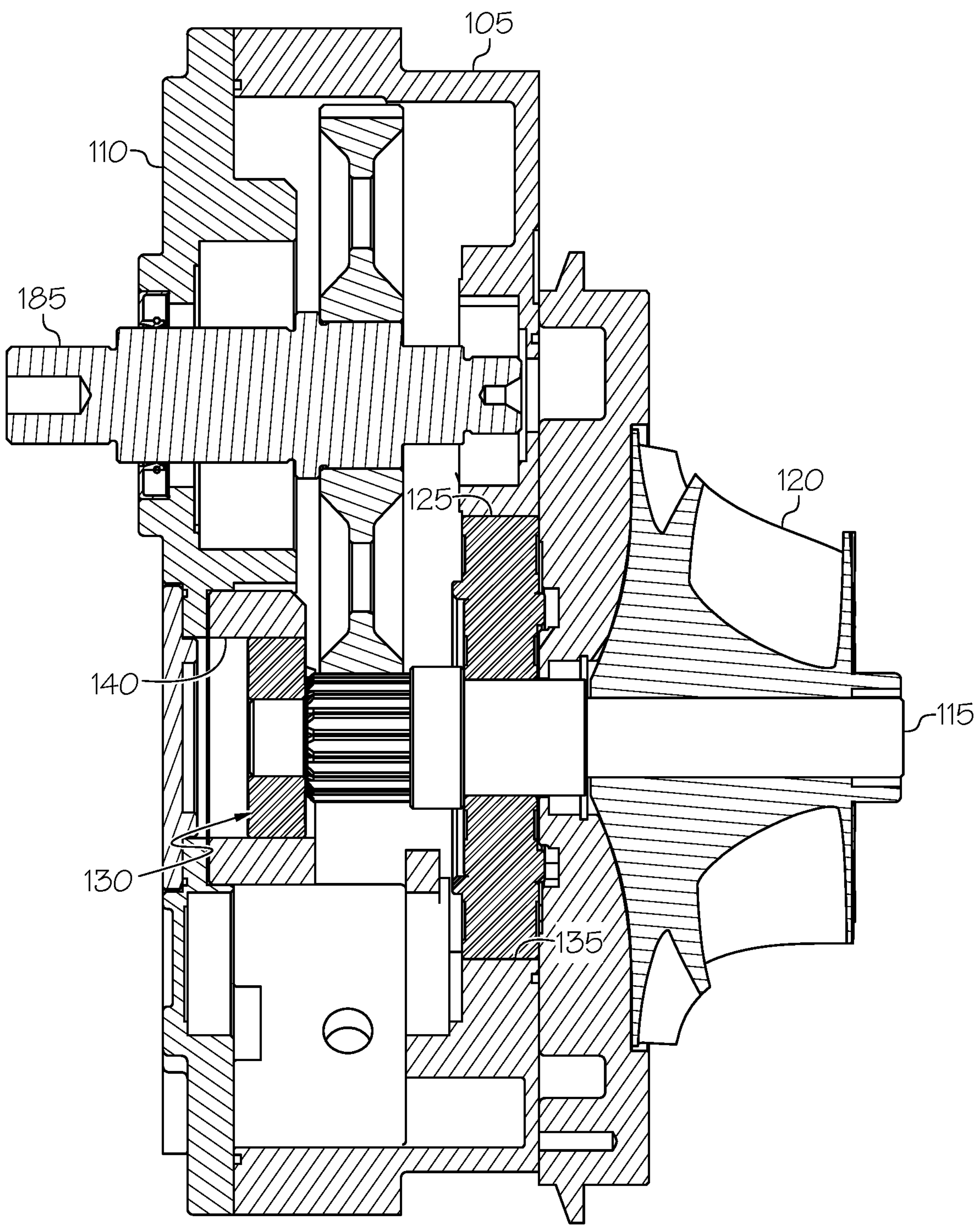
FIG. 13 is a cross sectional view of a supercharger transmission case assembly.

FIGS. 8-11 show various views of a supercharger 200 including the transmission case 105, transmission cover 110 and a compressor housing 205 containing the impeller 120. Air drawn through the impeller 120 is compressed within the compressor housing 205 and exits the supercharger 200 through the outlet 210. FIG. 13 is a cross sectional view of a supercharger transmission case assembly 100.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is:

1. A supercharger transmission case comprising:

a forward impeller shaft bearing bore machined into the forward surface of a main body of the transmission case, said forward impeller shaft bearing bore sized for receiving a forward impeller shaft bearing;

a rear impeller shaft bearing bore machined into a bridge portion of said transmission case, said rear impeller shaft bearing bore sized for receiving a rear impeller shaft bearing, said bridge positioned rearward of and spanning said forward impeller shaft bearing bore.

2. The supercharger transmission case of claim 1 wherein said transmission case comprises a low thermal expansion material to reduce positional variance of an impeller shaft assembly and permit use of reduced bearing-to-bore-surface clearances.

3. The supercharger transmission case of claim 1 wherein said transmission case comprises a low thermal expansion material to reduce oscillation or other transverse movement of an impeller shaft and an impeller assembly relative to the shaft longitudinal axis.

4. The supercharger transmission case of claim 2 wherein said low thermal expansion material comprises a hypereutectic metal matrix.

5. The supercharger transmission case of claim 4 wherein said hypereutectic metal matrix comprises aluminum and silicon.

6. The supercharger transmission case of claim 3 wherein said low thermal expansion material comprises a hypereutectic metal matrix.

7. The supercharger transmission case of claim 6 wherein said hypereutectic metal matrix comprises aluminum and silicon.

* * * * *